(12) United States Patent
Pike et al.

(10) Patent No.: US 7,336,844 B2
(45) Date of Patent: Feb. 26, 2008

(54) IMAGE ENHANCEMENT

(75) Inventors: Edward Roy Pike, 3A Golborne Mews, London W10 5SB (GB); Deeph Chana, London (GB); Ben McNally, London (GB)

(73) Assignee: Edward Roy Pike, London (GB)

( * ) Notice: Subject to any disclaimer, the term of this patent is extended or adjusted under 35 U.S.C. 154(b) by 798 days.

(21) Appl. No.: 10/332,688

(22) PCT Filed: Jul. 11, 2001

(86) PCT No.: PCT/GB01/03127

§ 371 (c)(1),
(2), (4) Date: Oct. 3, 2003

(87) PCT Pub. No.: WO02/05212

PCT Pub. Date: Jan. 17, 2002

(65) Prior Publication Data

US 2004/0066959 A1    Apr. 8, 2004

(30) Foreign Application Priority Data

Jul. 11, 2000  (GB) ................... 0017039.9

(51) Int. Cl.
*G06K 9/40* (2006.01)
(52) U.S. Cl. .................................... 382/254
(58) Field of Classification Search ................ 382/128, 382/132, 254, 255, 274, 275
See application file for complete search history.

(56) References Cited

U.S. PATENT DOCUMENTS 5,594,807 A    1/1997   Liu
5,878,108 A *  3/1999   Baba et al. ................ 378/98.4

FOREIGN PATENT DOCUMENTS

EP    0394959 A2    10/1990
EP    0394959 A3    10/1990

OTHER PUBLICATIONS

Pham et al, "Maximum likelihood estimation of a class of non-Gaussian densities with application to deconvolution," IEEE Trans. Acoustics, Speech and Signal Processing, vol. ASSP-37, pp. 73-82, Jan. 1989.*
You et al, "A Regularization Approach to Joint Blur Identification and Image Restoration," IEEE Trans. On Image Processing, vol. 5, No. 3, Mar. 1996.*
Pun et al., "Model Adaptive Image Restoration", Signals, Systems and Computers—Conference Record of the Twenty-Seventh Asilomar Conference on Pacific Grove, CA USA Nov. 1-3, 1993, Los Alamitos CA, USA, *IEEE Computer. Soc.*, pp. 573-577 (Nov. 1, 1993).
Fish et al., "Blind deconvolution by means of the Richardson-Lucy algorithm", *J. Opt. Soc. Am. A.*, 12(1): 58-65 (1995).

* cited by examiner

*Primary Examiner*—Matthew C. Bella
*Assistant Examiner*—Tom Y Lu
(74) *Attorney, Agent, or Firm*—Drinker Biddle & Reath

(57) ABSTRACT

A method of deblurring images e.g. from an MRI scan, comprises calculating the distribution of the slope value of the intensities between the pixels in the image, and using a Levy distribution of power factor k of 1 (Cauchy distribution) up to but not including (2) to determine the correction term to be applied.

12 Claims, 2 Drawing Sheets

Original object

Blurring function

Recorded blurred and noisy image

Wiener reconstruction

After 1 iteration

After 3 iterations

After 6 iterations

After 20 iterations

IMAGE ENHANCEMENT

Figure 1B:
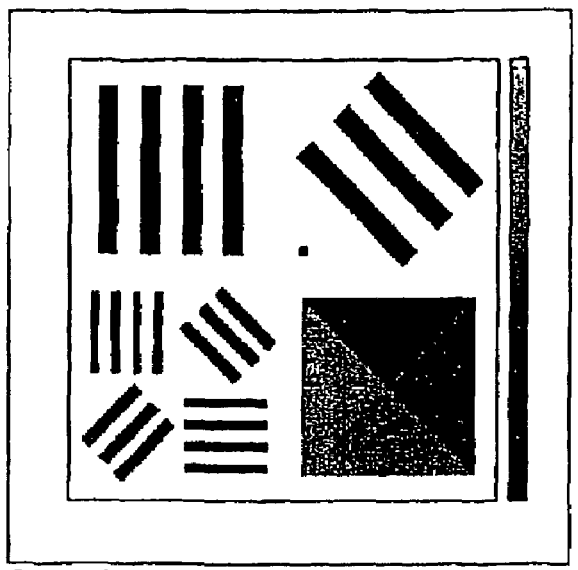
Figure 1B:
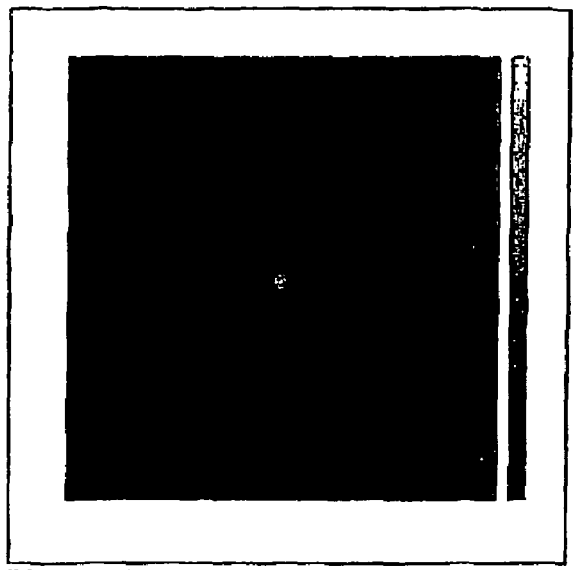

The present invention relates to a method for enhancing images, more particularly it relates to a method for the computer enhancement of visual images so that the original object can be more clearly seen and identified.

Visual images which lack clarity are widely obtained for example from CCTV cameras, from imaging of the body and brain e.g. mammography and other scans, from pictures obtained from telescopes e.g. in space or under bad lighting conditions. A common problem with images is that the contrast between two adjacent parts of the image is reduced or narrowed in the image compared with the original object and this means that detail is lost and the value of the image is reduced.

Another problem is the formation of false images such as "ringing" arising from an image enhancing process and/or pictures generated by an image processing method where artefacts such as noise or absent edges often deviate from the original.

A particularly important area is in the medical field where images of the human body or brain e.g. obtained by X-rays, ultra sound or by Magnetic Resonance Imaging (MRI) etc. have their value reduced by lack of detail.

In MRI of the brain there are several reasons why the images obtained lack clarity and some of these e.g. movement of the patient, the limiting resolution of the imaging or tomographic system and high noise levels, which are encountered in functional MRI are likely to be inherent. It is important that the images can be enhanced and we have devised a method for enhancing images.

In a known image processing method every image signal is replaced by a modified value which is based on the values of the image signals from the surrounding field of image elements. The signals from the surrounding field are used to form a number of different combinations each of which represents a different component of the image structure within the field.

Several methods are described in M. Bertero and P. Boccacci 1998 Introduction To Inverse problems in Imaging (London: IOP).

These methods remove noise but introduce visible artefacts, particularly in areas where the intensity values across the image are changing slowly, causing an artefact to appear as an edge.

We have now devised an improved method for enhancing images. This is based on the fact that we have found that most images appear to obey a Levy distribution for their pixel slopes.

According to the invention there is provided a method for image processing which comprises the acquisition or formation of an image, calculating the distribution of the slope value of the intensities between the pixels in the image, comparing this distribution with a Levy distribution of power factor k≧1, determining a correction term and applying the correction term to the original image to obtain a processed image.

Expressed as a Fourier transform, a zero centred, symmetric, Levy distribution contains two free parameters, viz scale and power (c,k) and is given by $$L_{c,k}(x) = \frac{1}{2\pi} \int_{-\infty}^{\infty} e^{-c|\omega|^k} e^{i\omega x} d\omega$$

For the Levy distributions used in the present invention the power factor (k) can range from 1 (Cauchy Distribution) up to 2 (Gaussian distribution). In different images different power factors in the Levy distribution can be exploited, the power factor (k) chosen being selected on a priori information elucidated by prior analysis and/or experience to give the best fit.

The method can be repeated iteratively using the image result from a former iteration as the starting point image for a subsequent iteration. A preferred realisation involves holding the non-fixed parameter c from the first iteration to completion. Other iterations allow the iterative updating of c.

The image can be formed from any conventional method in which an image is obtained and converted to electronic signals, normally digitised, and then it can be projected onto a screen e.g. a VDU or to a printer or other device for inspection. The method of the present invention enables the image projected onto the screen to be enhanced so as to present an image of greater clarity than otherwise be achieved.

The invention works for many types of image and is particularly applicable to images obtained from MRI.

A Cauchy distribution gives good results even for images with Levy index >1, this is because significant enhancement may still be achieved even when the distribution is not tailored to the image statistics, whereupon further enhancements are achieved. The calculation of the slopes and obtaining the distribution of the slopes can be carried out by a computer using known techniques.

When an image is blurred during capture by an imaging system of unknown characteristics, this invention, in conjunction with a blind deconvolution method may both resolve the quality of the image and characterise the imaging properties of the image capture system. The image can be deconvolved by using known methods e.g. as described in "Blind Deconvolution by Means of the Richardson-Lucy Algorithm" D A Fish, A M Brinicombe, E R Pike and J G Walker Journal of The Optical Society of America A, 12, 58-65 1995.

The invention is illustrated in detail to reconstruct an unknown object that has been blurred by a space invariant aberration. Using the Fourier method to model the problem $$g(i,j) = f(i,j) \otimes k(i,j) + \eta(i,j)$$

Where, g(i,j) is the measured data, k(i,j) is the point spread function, f(i,j) is the unknown object and η(i,j) is a noise process.

The slopes of the image can be approximated in the x and y directions by a finite difference scheme. Using the forward difference $$\delta_x(x,y) = f(x+1,y) - f(x,y)$$

$$\delta_y(x,y) = f(x+1,y) - f(x,y)$$

Setting the total slope, s as the magnitude of the combined $\delta_x$ and $\delta_y$ slopes gives $$s(x,y) = \sqrt{\delta_x^2 + \delta_y^2}$$
$$= \sqrt{[f(x+1,y) - f(x,y)]^2 + [f(x,y+1) - f(x,y)]^2}$$

For example using a two dimensional Levy distribution with k=1, known as the symmetric Cauchy distribution in $R^2$, as the distribution to describe the probability density function of the $(\delta_x, \delta_y)$ slopes the calculation can be progressed analytically. For other values of k numerical methods must be used. Thus for k=1

$$P(\delta_x, \delta_y) = \frac{1}{2\pi} \frac{c}{(c^2 + \delta_x^2 + \delta_y^2)^{3/2}}$$

$$= \frac{1}{2\pi} \frac{c}{(c^2 + s^2)^{3/2}}$$

Assuming that all the increments are uncorrelated the likelihood of the image is a product of the probability density of all pixel values. Taking the logarithm of this value (the log likelihood).

$$\log(L) = \log\left\{\prod_{x,y} P(\delta_x(x, y), \delta_y(x, y))\right\}$$

$$= \log\left\{\prod_{x,y} \frac{1}{2\pi} \frac{c}{(c^2 + \delta_x^2(x, y) + \delta_y^2(x, y))^{3/2}}\right\}$$

$$= \sum_{x,y} \log\left\{\frac{1}{2\pi} \frac{c}{(c^2 + s^2(x, y))^{3/2}}\right\}$$

$$= \sum_{x,y} -\log\left\{\frac{2\pi}{c} (c^2 + s^2(x, y))^{3/2}\right\}$$

It is desired to maximise Q where $$Q = \log(L) - \lambda \times MSE$$

and MSE is the mean square error given by $$MSE = \sum_{i,j} \{g(i, j) - f(i, j) \otimes k(i, j)\}^2$$

From this the value of $\lambda$ can be determined which will maximise Q as $$\Rightarrow d(i, j) = 3\left\{\frac{\delta_x(i, j) + \delta_y(i, j)}{c^2 + s^2(i, j)} - \frac{\delta_x(i-1, j)}{c^2 + s^2(i-1, j)} - \frac{\delta_y(i, j-1)}{c^2 + s^2(i, j-1)}\right\}$$

and $$D(u,v) + \lambda\{G(u,v) - F(u,v)K(u,v)\} K^-(u,v) = 0$$

After solving for F(u,v) this becomes $$F(u, v) = \frac{G(u, v)K^*(u, v)}{|K(u, v)|^2} + \frac{1}{\lambda} \frac{D(u, v)}{|K(u, v)|^2}$$

Taking a solution $$B(u, v) = \frac{D(u, v)}{|K(u, v)|^2}$$

$$f_{new}(i, j) = f_{old}(i, j) + \frac{1}{\lambda} b(i, j)$$

the total slopes will be updated by $$s_{new}(i, j) = s_{old}(i, j) + \frac{1}{\lambda} s_b(i, j)$$

where b(i,j) is a correction term so that $\lambda$ is given by $$\lambda = -\frac{\sum_{i,j} \frac{s_b^2(i, j)}{c^2 + s_{new}^2(i, j)}}{\sum_{i,j} \frac{s_{old}(i, j)s_b(i, j)}{c^2 + s_{new}^2(i, j)}}$$

A similar analysis can be performed using a centred difference formula to approximate the slope values which leads to a slightly different expression for d(i,j)

The process is preferably reiterated a number of times with the process repeated on the previously corrected image to obtain further enhancement, preferably there is alternating use of forward difference and centred difference in each iteration.

In one preferred embodiment, an image is made by some means and a Wiener solution is calculated. The total slope histogram for the reconstruction is calculated and fitted by a symmetric Cauchy in $R^2$. From this a correction term c is obtained.

Using the x,y and s slopes and c, the correction term written d(i,j) is calculated. This term is transformed into Fourier space and used to obtain B(u,v). ② is then calculated and, after dividing B(u,v), is added to the old reconstruction, the new reconstruction is then put back into real space and the process reiterated.

The number of iterations used to obtain the best results can be determined from a priori assumptions about the appearance of the original object.

A similar analysis may be performed using a centred-difference formula to approximate the slope values.

Thus it is possible to enhance the original image.

The reconstruction formed does not have to have a slope which closely matches a Levy distribution and it has been found that the method of the invention works on synthetic shapes.

The method of the invention was demonstrated by taking an image of an original object, blurring it by using a blurring function and reconstructing it using a conventional method (Wiener reconstruction) and by using the method of the invention, alternating forward and centred difference, k=1; the results are illustrated in the accompanying drawings in which:—

FIG. 1*a* shows the original object,

FIG. 1*b* shows the blurring function

Figure 1C:
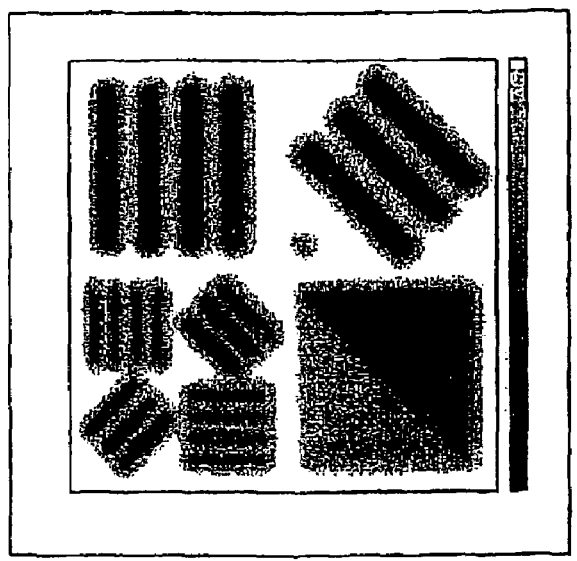

FIG. 1*c* shows the recorded blurred and noisy image

Figure 1D:
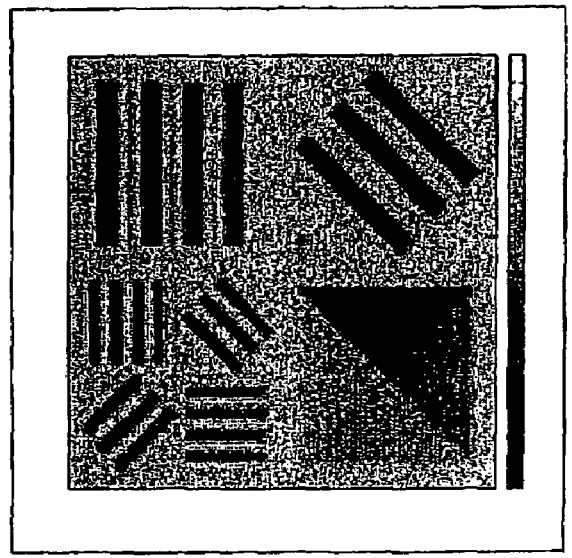

FIG. 1*d* shows a conventional reconstruction

Figure 2A:
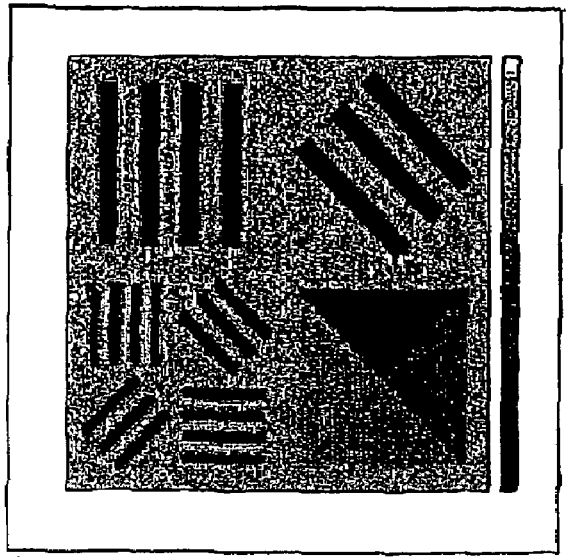
Figure 2B:
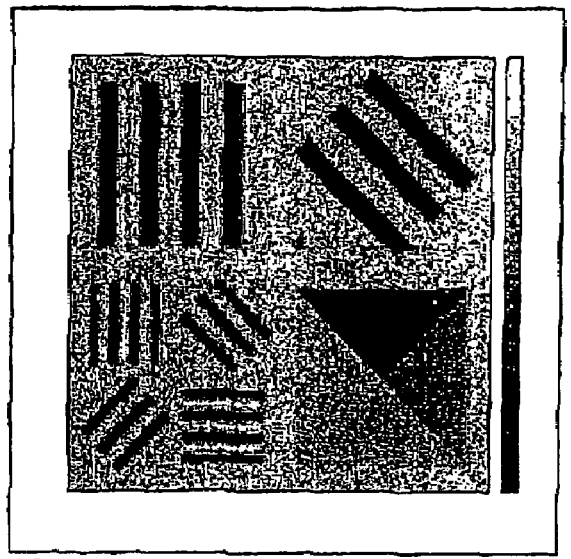
Figure 2C:
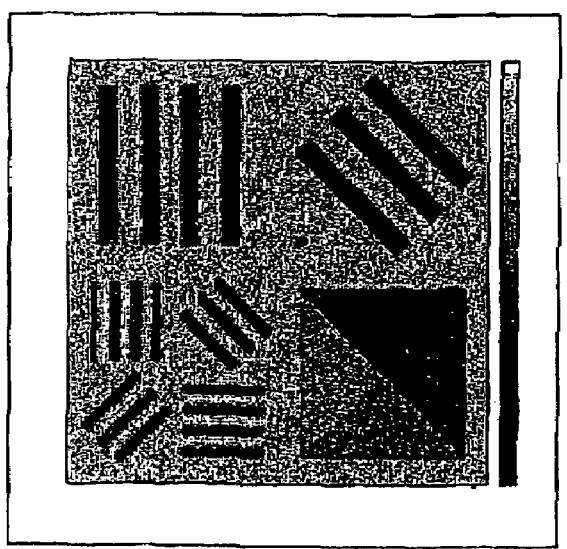
Figure 2D:
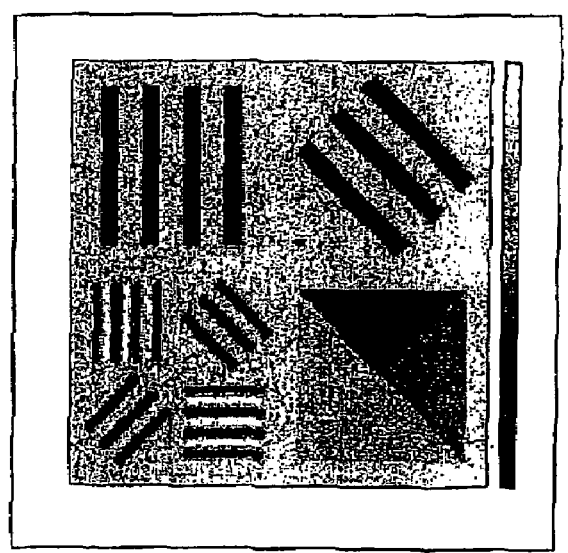

FIG. 2*a* shows a reconstruction using the method of the invention after one iteration FIG. 2*b* after three iterations FIG. 2*c* after six iterations and FIG. 2*d* after 20 iterations.

As can be seen the method of the invention gives a superior reconstruction of the object.

The invention claimed is:

1. A method for image processing which comprises forming an image, calculating the distribution of the slope value of the intensities between the pixels in the image, comparing this distribution with a Levy distribution of power factor $k \geq 1$, determining a correction term and applying the correction term to the image to obtain a processed image.

2. A method as claimed in claim 1 in which the power factor is from 1 up to, but not including, 2.

3. A method as claimed in claim 1 in which the power factor is 1.

4. A method as claimed in claim 1 in which the method is repeated iteratively using the processed image from a prior iteration as the starting image for a subsequent iteration.

5. A method as claimed in claim 4 in which a non-fixed parameter c defining the distribution for the first iteration is used in subsequent iterations.

6. A method for image processing which comprises forming an image, subjecting the image to blind deconvolution to obtain a blurring function, calculating the distribution of the slope value of the intensities between the pixels in the image, comparing this distribution with a Levy distribution of power factor $k \geq 1$, determining a correction term and applying the correction term to the image to obtain a processed image.

7. A method as claimed in claim 1 in which the image is obtained is an image of part or all of the human body.

8. A method as claimed in claim 7 in which the image is obtained by X-rays, ultra sound or by magnetic resonance imaging.

9. A method as claimed in claim 6 in which the power factor is from 1 up to, but not including, 2.

10. A method as claimed in claim 6 in which the power factor is 1.

11. A method as claimed in claim 6 in which the method is repeated iteratively using the processed image from a prior iteration as the starting image for a subsequent iteration.

12. A method as claimed in claim 11 in which a non-fixed parameter c defining the distribution for the first iteration is used in subsequent iterations.

* * * * *